United States Patent
Shi et al.

(10) Patent No.: US 7,672,057 B2
(45) Date of Patent: Mar. 2, 2010

(54) MICROSCOPE OBJECTIVE

(75) Inventors: Renhu Shi, Goettingen (DE); Anke Vogelgsang, Goettingen (DE); Thomas Bocher, Goettingen (DE); Werner Kleinschmidt, Adelebsen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 12/053,368

(22) Filed: Mar. 21, 2008

(65) Prior Publication Data

US 2008/0247050 A1 Oct. 9, 2008

(30) Foreign Application Priority Data

Mar. 23, 2007 (DE) .................. 10 2007 014 640

(51) Int. Cl.
*G02B 21/02* (2006.01)
(52) U.S. Cl. ........................ 359/660; 359/656
(58) Field of Classification Search ......... 359/656–660; 348/79–81
See application file for complete search history.

(56) References Cited

U.S. PATENT DOCUMENTS 5,731,894 A * 3/1998 Gross .................. 359/386
2003/0107978 A1* 6/2003 Yoshikawa et al. ..... 369/112.02

* cited by examiner

*Primary Examiner*—Darryl J Collins
(74) *Attorney, Agent, or Firm*—Patterson, Thuente, Skaar & Christensen P.C.

(57) ABSTRACT

A microscope objective having at least four lenses or groups of lenses and which can be used to improve image contrast. According to the invention, a phase plate, aligned concentrically to the optical axis, can be integrated into and taken out of the air space between the first lens and the second lens, as viewed from the object side. The defined arrangement of the phase plate and the associated shift of the real pupil into the air space between the first two lenses or groups of lenses, respectively, of the microscope objective allows a microscope objective, initially designed as a bright-field variant, to be redesigned as a phase contrast variant with relative ease.

10 Claims, 5 Drawing Sheets

Spherical longitudinal aberration in mm (lateral axis) depending on the relative coordinates of the exit pupil (vertical axis) at different wavelengths

FIELD CURVATURE

DISTORTION

Left diagram: Field curvature depending on the image height +y
Right diagram: Distortion in percent depending on the image height +y

MICROSCOPE OBJECTIVE

RELATED APPLICATION

The current application claims the benefit of priority to German Patent Application No. 102007014640.1 filed on Mar. 23, 2007. Said application is incorporated by reference herein.

FIELD OF THE INVENTION

The invention relates to a microscope objective which consists of at least four lenses or groups of lenses and can preferably be used to improve image contrast.

BACKGROUND OF THE INVENTION

The known microscopic phase contrast method allows to see object structures in cells which are invisible in the normal bright field. Thus, on the illumination side, only beams in the determined aperture region (generally annular) are selected for illumination of the phase object. On the image side, a cemented component consisting of, for example, two plane-parallel plates, is inserted at the location of the real pupil, and a specific structure is applied onto the cement surface so as to manipulate amplitude and phase. In doing so, zeroth order beams are attenuated, and the beams of higher orders receive a 90° phase jump. The attenuation of the light intensity at the annular pupil region is generally effected by metal layers, which in turn result in a strong reflection of the incident beam. Typical reflection values of the combined amplitudes/phase structures—hereinafter referred to as phase structure—are 50% and more.

For objectives with smaller image scales (less than 20×), the real pupil is located at the rear part of the objective where the beams are parallel or quasi-parallel. Where such axially parallel beams are nearly perpendicularly incident on the above-mentioned planar surfaces, in particular the annular region comprising metal layers with a high reflection value, scattered light is generated by reflection. This may have a strong impact on the image contrast, which is a frequent problem in microscope objectives for contrast methods.

JP 9197285 A1 describes a solution in which the scattered light is reduced by a curvature of the cemented surface. For this purpose, two lenses, namely a plano-convex lens and a plano-concave lens, are used. The light reflected at the phase structures then no longer passes back directly into the object but is expanded by the curvature of the cemented surface and is spread out over the entire object. Since the production of curved surfaces and the application of phase structures onto these curved surfaces is complex, the corresponding production costs are, in fact, very high.

Moreover, solutions are known wherein a phase plate consisting of two plane-parallel plates is installed in an objective such that said phase plate is inclined at an angle to the optical axis of the objective. However, due to the inclination of the phase plate, such objectives have a greater constructional length.

SUMMARY OF THE INVENTION

As a consequence, it is an object of the invention to provide a microscope objective which can be produced with relatively low complexity, has a short constructional length, and provides both a bright-field image and an image with improved image contrast and reduced scattering of observation light at the phase structures.

The possibility of arranging a phase plate between the first (as viewed from the object side) two lenses or groups of lenses, respectively, and thus the shifting of the real pupil into this air space, has the advantage that the beams are not paralleled at this point and, thus, impinge in an inclined manner onto the planar surfaces of a phase plate which can be arranged in this air space. The phase ring is vapor-deposited on one of the two planar plates, and the remaining volume is filled up with optical cement. The scattered light caused by double reflection at the phase ring (very high reflectance) as well as by the external surfaces of the glass plates is minimized, so that an improvement in image contrast is obtained as compared to conventional arrangements.

A displacement of the real pupil in the direction of the object is made more difficult by the requirements placed on the correction of imaging errors, such as field curvature, astigmatism and transverse chromatic aberrations. Therefore, the refractive powers of the individual lenses are selected such that an optimal compromise is made and, thus, the overall correction target of a planachromat class is achieved.

In planachromatically corrected micro-objectives, imaging errors, such as spherical aberration, primary longitudinal chromatic aberrations and coma, for example, are corrected and astigmatism is largely minimized. Further, the longitudinal chromatic aberrations (aberrations from the second spectrum), which are defined by the deviations of the focus positions between the spectral lines C'-e and F'-e, are 1.5 times the focal depth, with C' being 643.847 nm, F' being 479.991 nm, and e being 546.074 nm. The focal depth range is defined by $\lambda/NA^2$ ($\lambda$=wavelength, NA=numerical aperture). This range is referred to as a Rayleigh unit [R.U.].

Field flattening is reduced such that the best focus position at the field edge deviates from the axial focus position by less than 2.5 times the focal depth.

The defined arrangement of the phase ring and the associated shift of the real pupil into the air space between the first two lenses or groups of lenses, respectively, of the microscope objective allow a microscope objective, initially designed as a bright-field variant, to be redesigned as a phase contrast variant with relative ease.

The less expensive manufacturing process can be obtained by using the same lenses for both objective systems. The contrast variant merely requires a mechanical adaptation of the lenses' distances by insertion of intermediate rings. The phase structure is then applied to a planar plate which can be inexpensively manufactured. This is more favourable for manufacture in any case.

BRIEF DESCRIPTION OF THE DRAWINGS

The microscope objective according to the invention will be explained in more detail below with reference to two exemplary embodiments. In the drawings.

DETAILED DESCRIPTION

Figure 1:
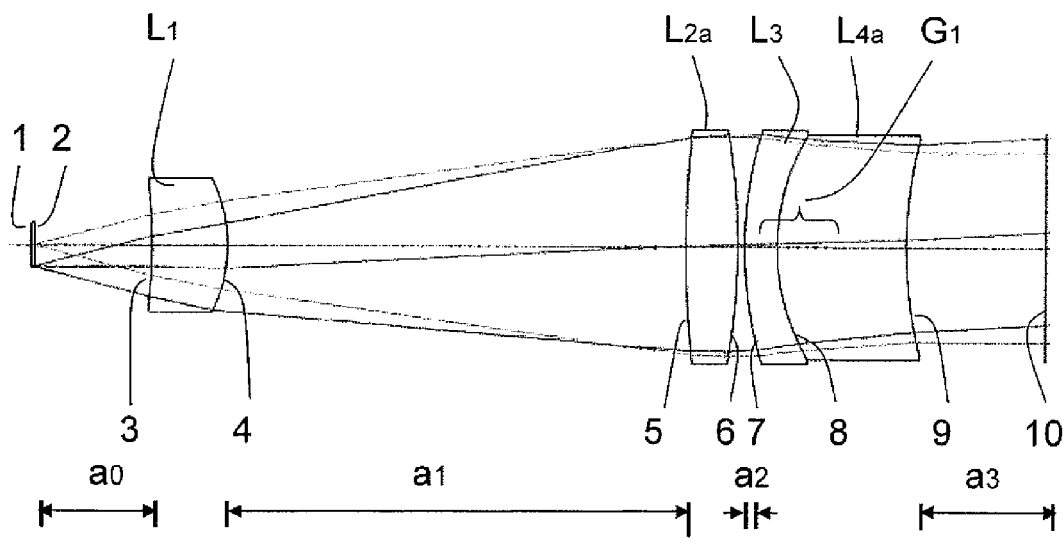
FIG. 1 depicts the lens section of an example 10×/0.25 microscope objective as a bright-field variant (without phase ring)

FIG. 1 shows an example embodiment of the microscope objective according to the invention (bright-field variant) of the "planachromat" class, comprising a meniscus lens L1 with positive power of refraction, a biconvex lens L2a with positive power of refraction, a cemented component G1 with negative power of refraction, consisting of a meniscus lens L3 with negative power of refraction in the direction of an object surface 2 and a meniscus lens L4a with positive power of refraction on the image side, and having the following system data:

| Surface | Radius | Thickness d Air clearance a | Refractive index $n_e$ | Abbe dispersion number $\nu_e$ |
|---|---|---|---|---|
| 1 | planar | 0.170 | 1.525 | 59.2 (cover glass) |
| 2 | planar | 5.009 (a0) | | |
| 3 | −22.910 | 3.500 (d1) | 1.489 | 70.0 |
| 4 | −7.047 | 21.893 (a1) | | |
| 5 | 50.930 | 2.400 (d2) | 1.628 | 60.1 |
| 6 | −30.690 | 0.300 (a2) | | |
| 7 | 18.450 | 1.500 (d3) | 1.723 | 29.3 |
| 8 | 10.093 | 6.000 (d4) | 1.489 | 70.0 |
| 9 | 19.815 | 7.788 (a3) | | |
| 10 | planar | 80.000 | | |

The system data were determined together with achromatized tube lenses having a focal length of 180 mm and the following specific values, such as numerical aperture NA = 0.25   location of the entrance pupil −∞
image scale = −10.0   object on the surface 1
field number = 20.

In this case, the transverse chromatic aberrations at the field edge were not corrected to zero. They are compensated for by the optics arranged subsequently to the intermediate image.

Figure 2:
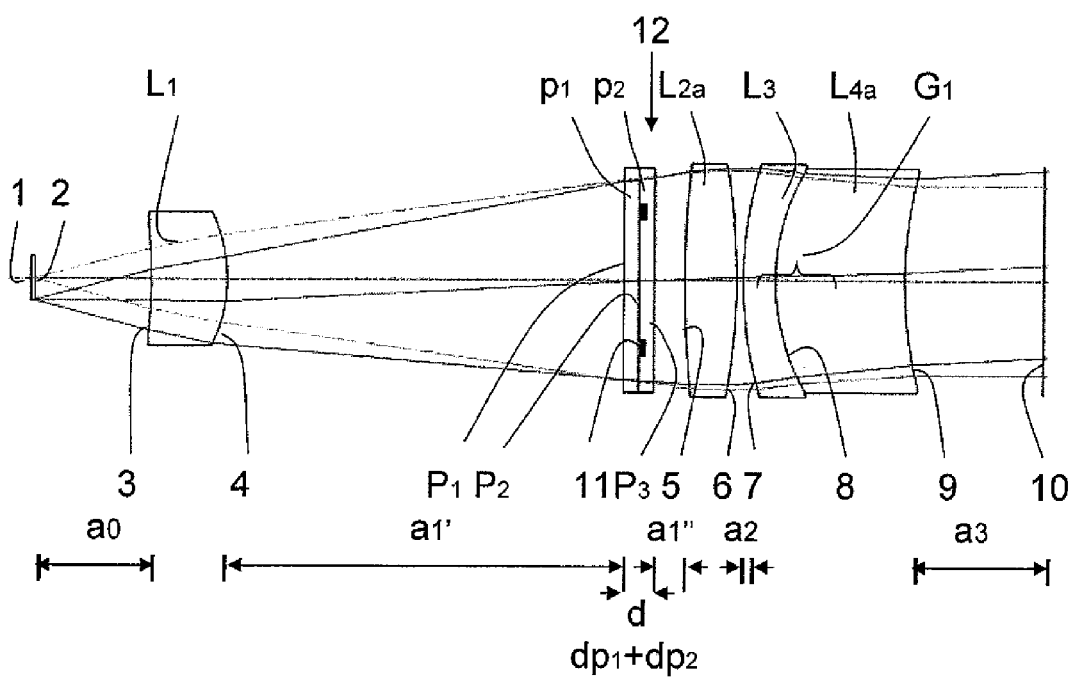
FIG. 2 depicts the lens section of an example 10×/0.25 microscope objective as a phase contrast variant.

FIG. 2 shows the arrangement of a phase plate 11 for improving the image contrast in the optical system according to FIG. 1.

The phase ring 11 is arranged concentrically on a plane-parallel plate p2. A further plane-parallel plate p1 is thus connected to the plate p2 by a cement substance. The two interconnected plane-parallel plates p1 and p2 form a so-called phase plate 12 together with the integrated phase ring 11.

According to the invention, the phase plate 12 is located in the air space (air clearance a1) between the lens L1 and the lens L2a, or the lens L2b within the back focus distance $s'_{F',L1}$ of the image-side focus of the lens L1 with respect to the vertex of the rear surface 4 of the first lens L1, in which case the following relationship holds true:

$$0 < s'_{F',L1}/a_1 < 1$$

The air clearances a1' (clearance between the surface 4 of the lens L1 and the surface P1 of the plane-parallel plate p1) and a1" (clearance between the surface P3 of the plane-parallel plate p3 and the surface 5 of the lens L2a) accordingly characterize the location of the phase plate 12 in the microscope objective, with the surfaces P1, P2 and P3 of the phase plate 12 being located at an angle of 90 degrees to the optical axis.

The above-mentioned condition is satisfied by the following system data (modified air clearances):

| Surface | Radius | Thickness d Air clearance a | Refractive index $n_e$ | Abbe dispersion number $\nu_e$ |
|---|---|---|---|---|
| 1 | planar | 0.170 | 1.525 | 59.2 (cover glass) |
| 2 | planar | 5.009 (a0) | | |
| 3 | −22.910 | 3.500 (d1) | 1.489 | 70.0 |
| 4 | −7.047 | 19.371 (a1') | | |
| P1 | planar | 0.700 (dp1) | 1.519 | 64.0 |
| P2 | planar | 0.700 (dp2) | 1.519 | 64.0 |
| P3 | planar | 1.600 (a1") | | |
| 5 | 50.930 | 2.400 (d2) | 1.628 | 60.1 |
| 6 | −30.690 | 0.300 (a2) | | |
| 7 | 18.450 | 1.500 (d3) | 1.723 | 29.3 |
| 8 | 10.093 | 6.000 (d4) | 1.489 | 70.0 |
| 9 | 19.815 | 7.788 (a3) | | |
| 10 | planar | 80.000 | | |

Figure 3:
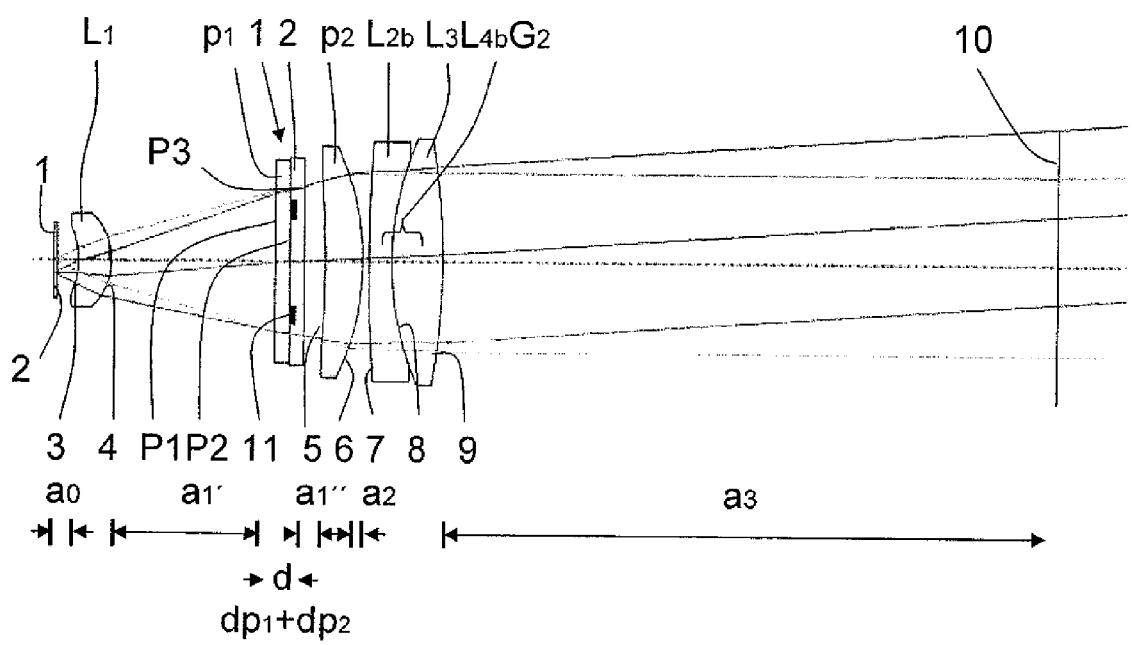
FIG. 3 depicts the lens section of an example 20×/0.4 microscope objective as a phase contrast variant.

FIG. 3 shows an exemplary embodiment of the microscope objective according to the invention as a phase contrast variant comprising a meniscus lens L1 with positive power of refraction, a meniscus lens L2b with positive power of refraction, a double cemented component G2 with positive power of refraction, consisting of a meniscus lens L3 with negative power of refraction in the direction of an object surface 2 and a biconvex lens L4b with positive power of refraction on the image side with the system data for the bright-field variant (not shown), i.e. without the phase plate 12:

| Surface | Radius | Thickness d Air clearance a | Refractive index $n_e$ | Abbe dispersion number $\nu_e$ |
|---|---|---|---|---|
| 1 | planar | 0.170 | 1.525 | 59.2 (cover glass) |
| 2 | planar | 1.201 (a0) | | |
| 3 | −3.221 | 1.400 (d1) | 1.654 | 58.2 |
| 4 | −2.312 | 9.531 (a1) | | |
| 5 | −46.880 | 1.900 (d2) | 1.623 | 60.1 |
| 6 | −8.995 | 0.400 (a2) | | |
| 7 | 35.650 | 1.000 (d3) | 1.723 | 29.3 |
| 8 | 9.078 | 2.600 (d4) | 1.489 | 70.0 |
| 9 | −33.040 | 30.359 (a3) | | |
| 10 | planar | 80.000 | | |

The system data were determined together with achromatized tube lenses having a focal length of 180 mm and the following specific values, such as numerical aperture NA = 0.40   location of the entrance pupil −∞
image scale = −19.8   object on the surface 1
field number = 20.

In this case, the transverse chromatic aberrations at the field edge were not corrected to zero, as in the exemplary embodiment according to FIG. 1. They are compensated for by the optics arranged subsequently to the intermediate image.

With an integrated phase plate 12 (phase contrast variant as illustrated) the following system data result due to the modification of the air clearances:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 1.201 (a0) | | |
| 3 | −3.221 | 1.400 (d1) | 1.654 | 58.2 |
| 4 | −2.312 | 7.993 (a1') | | |
| P1 | planar | 0.700 (dp1) | 1.519 | 64.0 |
| P2 | planar | 0.700 (dp2) | 1.519 | 64.0 |
| P3 | planar | 0.600 (a1") | | |
| 5 | −46.880 | 1.900 (d2) | 1.623 | 60.1 |
| 6 | −8.995 | 0.400 (a2) | | |
| 7 | 35.650 | 1.000 (d3) | 1.723 | 29.3 |
| 8 | 9.078 | 2.600 (d4) | 1.489 | 70.0 |
| 9 | −33.040 | 30.359 (a3) | | |
| 10 | planar | 80.000 | | |

Both in the example embodiment according to FIGS. 1 and 2 and in the example embodiment according to FIG. 3, analogous objective calculations are possible also for tube systems having focal lengths of 164.5 mm and 200 mm. Radiuses of curvature other than those set forth in the system data tables are also conceivable.

Figure 4:
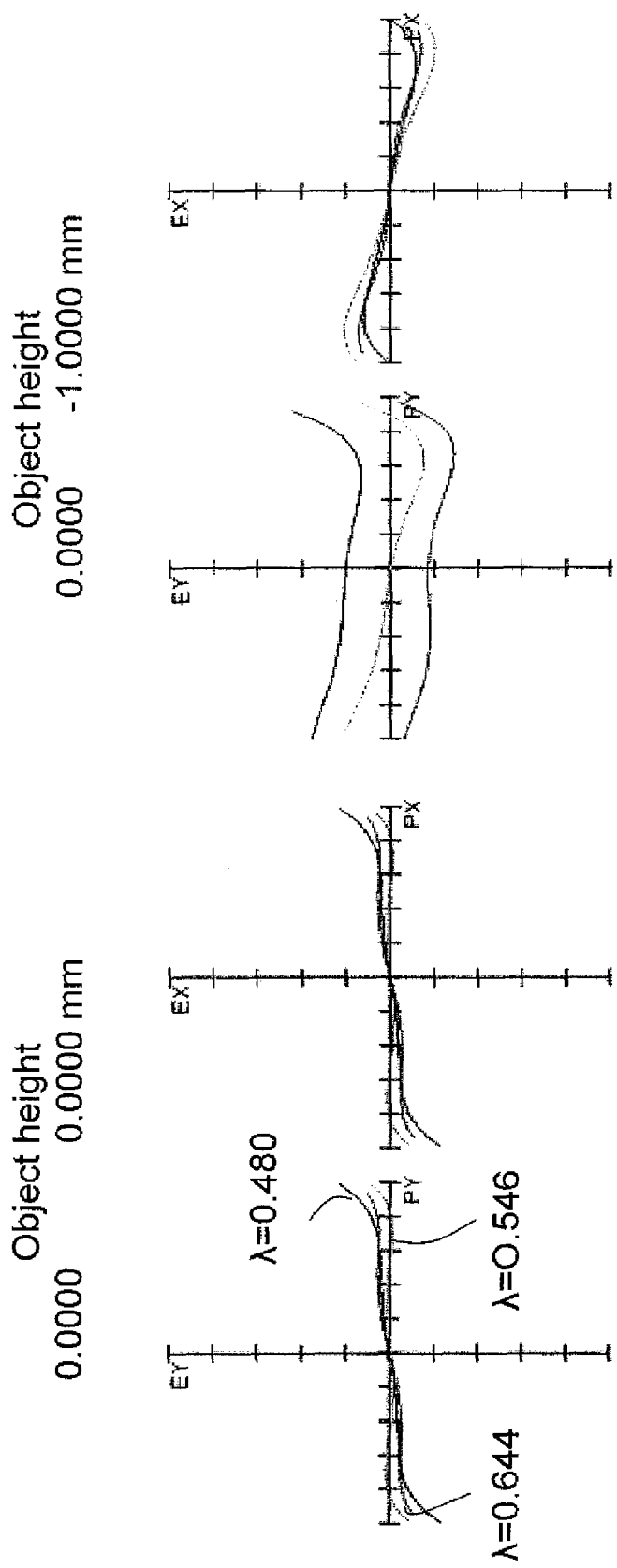
FIG. 4 depicts a representation of the transverse aberrations in the example 10×/0.25 microscope objective according to FIG. 1.
Figure 5:
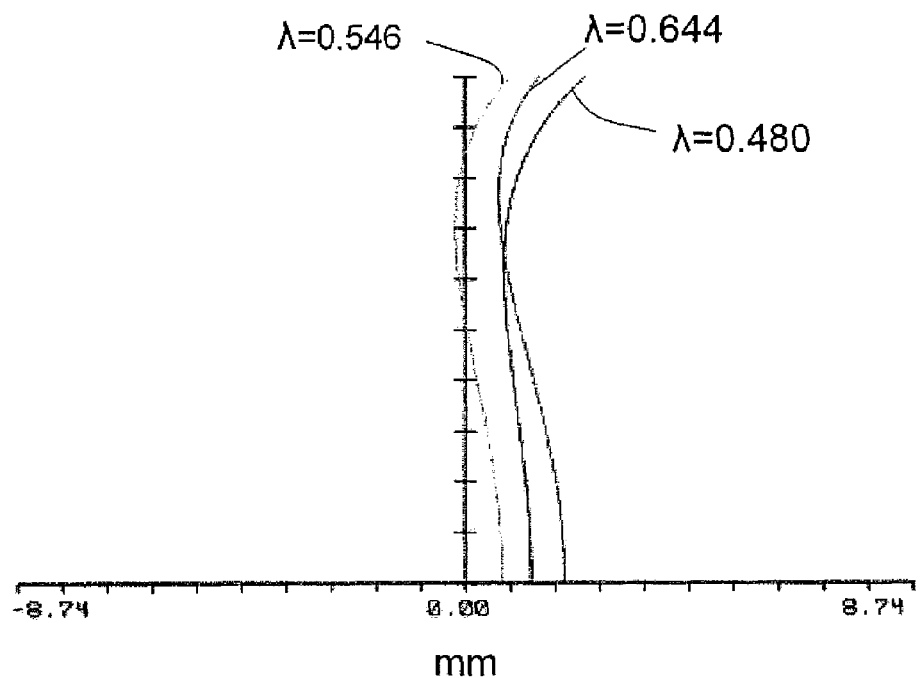
FIG. 5 depicts a representation of the longitudinal aberrations in the example 10×/0.25 microscope objective according to FIG. 1.

FIGS. 4 and 5 show curves of the image errors depending on the aperture and the field of view for the system data corresponding to the example embodiment according to FIG. 1. The shapes of the curves shown change only slightly after insertion of the phase plate 12 into the microscope objective.

FIG. 4 shows transverse aberrations with a tube of f'$_{Tube}$=180 mm. Any transverse chromatic aberrations appearing are compensated for by subsequently arranged optics not shown in detail.

The two diagrams on the left show the transverse aberrations for the axial object point depending on the exit pupil, respectively for the meridional (left) and sagittal (right) sections. The profiles of the transverse aberrations are identical for the axial image.

In both diagrams on the right-hand side of FIG. 4, the transverse aberrations for the maximum object height are visible.

Figure 6:
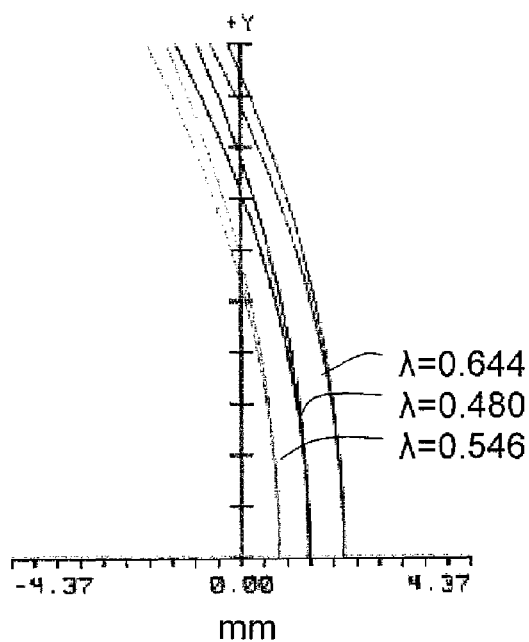
FIG. 6 depicts a representation of field-dependent image errors in the example 10x/0.25 microscope objective according to FIG. 1.
Figure 6:
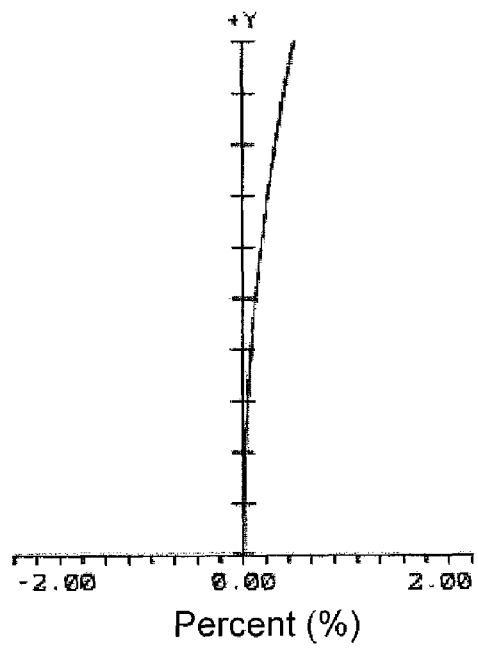

FIGS. 5 and 6 show longitudinal aberrations on the axis as well as field-dependent image errors, with FIG. 5 showing spherical longitudinal aberrations in mm (lateral axis) depending on relative coordinates of the exit pupil (vertical axis) at different wavelengths.

In the diagram on the left, FIG. 5 shows the field curvature depending on the image height +y, and in the diagram on the right, it shows the percentage of distortion depending on the image height +y.

In one embodiment of the invention, the system values and the values related to achromatized tube lenses are approximately as indicated in the above tables and specifications.

In another embodiment of the invention, the system values and the values related to achromatized tube lenses are about as indicated in the above tables and specifications.

In another embodiment of the invention, the system values and the values related to achromatized tube lenses may vary within ten percent of the values as indicated in the above tables and specifications.

In another embodiment of the invention, the system values and the values related to achromatized tube lenses may vary within five percent of the values as indicated in the above tables and specifications.

In another embodiment of the invention, the system values and the values related to achromatized tube lenses may vary within two percent of the values as indicated in the above tables and specifications.

LIST OF REFERENCE SYMBOLS 1, 2, 3, 4, 5, 6, 7, 8, 9, 10 Lens surface
11 Phase ring
12 Phase plate
P1,P2,P3 Surface of plane plates
a0,a1,a1',a1",a2,a3 Air clearance
p1,p2 Plane-parallel plate
L1,L2a,L2b,L3,L4a,L4b Lens
D Thickness
G1,G2 Cemented group (group of lenses)

The invention claimed is:

1. A microscope objective, comprising:
at least four lenses or groups of lenses including a first lens, a second lens, a third lens and a fourth lens, and a phase plate, aligned substantially concentrically to an optical axis, wherein the phase plate can be integrated into and left out of an air space between the first lens and the second lens, as viewed from the object side; and
wherein the phase plate, when arranged in the microscope objective, is located substantially within the back focus distance of the image-side focus $s'_{F',L1}$ of the first lens (L1) with respect to the vertex of the rear surface, and the following condition is satisfied:

$$0 < s'_{F',L1}/a_1 < 1$$

wherein $a_1$ is the air clearance between the first lens and the second lens.

2. The microscope objective as claimed in claim 1, wherein the first lens comprises a meniscus lens with positive power of refraction, the second lens comprises a biconvex lens with positive power of refraction, the third lens and the fourth lens comprising together a cemented component with negative power of refraction, the third lens being a meniscus lens with negative power of refraction located on the object side and the fourth lens comprising a meniscus lens with positive power of refraction located on the image side.

3. The microscope objective as claimed in claim 2, which when the phase plate is left out of the air space between the first lens and the second lens comprises surface interfaces 1, 2, 3, 4, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 5.009 (a0) | | |
| 3 | −22.910 | 3.500 (d1) | 1.489 | 70.0 |
| 4 | −7.047 | 21.893 (a1) | | |
| 5 | 50.930 | 2.400 (d2) | 1.628 | 60.1 |
| 6 | −30.690 | 0.300 (a2) | | |
| 7 | 18.450 | 1.500 (d3) | 1.723 | 29.3 |
| 8 | 10.093 | 6.000 (d4) | 1.489 | 70.0 |
| 9 | 19.815 | 7.788 (a3) | | |
| 10 | planar | 80.000 | | | and further comprising achromatized tube lenses having a focal length of about 180 mm and the following approximate values:

numerical aperture = 0.25　　location of the entrance pupil −∞
image scale = −10.0　　object on the surface 1
field number = 20.

4. The microscope objective as claimed in claim 2, which when the phase plate is integrated into the air space between the first lens and the second lens comprises surface interfaces 1, 2, 3, 4, P1, P2, P3, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 5.009 (a0) | | |
| 3 | −22.910 | 3.500 (d1) | 1.489 | 70.0 |
| 4 | −7.047 | 19.371 (a1') | | |
| P1 | planar | 0.700 (dp1) | 1.519 | 64.0 |
| P2 | planar | 0.700 (dp2) | 1.519 | 64.0 |
| P3 | planar | 1.600 (a1") | | |
| 5 | 50.930 | 2.400 (d2) | 1.628 | 60.1 |
| 6 | −30.690 | 0.300 (a2) | | |
| 7 | 18.450 | 1.500 (d3) | 1.723 | 29.3 |
| 8 | 10.093 | 6.000 (d4) | 1.489 | 70.0 |
| 9 | 19.815 | 7.788 (a3) | | |
| 10 | planar | 80.000 | | | and further comprising achromatized tube lenses having a focal length of about 180 mm and the following approximate values:

numerical aperture = 0.25   location of the entrance pupil −∞
image scale = −10.0   object on the surface 1
field number = 20.

5. The microscope objective as claimed in claim 1, wherein as viewed from the object side, the first lens comprises a meniscus lens with positive power of refraction, the second lens comprises a meniscus lens with positive power of refraction, the third lens and fourth lens comprise together a double cemented component with positive power of refraction, the third lens comprising a meniscus lens with negative power of refraction located on the object side and the fourth lens comprising a biconvex lens with positive power of refraction located on the image side.

6. The microscope objective as claimed in claim 5, which when the phase plate is left out of the air space between the first lens and the second lens comprises surface interfaces 1, 2, 3, 4, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 1.201 (a0) | | |
| 3 | −3.221 | 1.400 (d1) | 1.654 | 58.2 |
| 4 | −2.312 | 9.531 (a1) | | |
| 5 | −46.880 | 1.900 (d2) | 1.623 | 60.1 |
| 6 | −8.995 | 0.400 (a2) | | |
| 7 | 35.650 | 1.000 (d3) | 1.723 | 29.3 |
| 8 | 9.078 | 2.600 (d4) | 1.489 | 70.0 |
| 9 | −33.040 | 30.359 (a3) | | |
| 10 | planar | 80.000 | | | and further comprising achromatized tube lenses having a focal length of about 180 mm and the following approximate values:

numerical aperture = 0.40   location of the entrance pupil −∞
image scale = −19.8   object on the surface 1
field number = 20.

7. The microscope objective as claimed in claim 6, which when the phase plate is integrated into the air space between the first lens and the second lens comprises surface interfaces 1, 2, 3, 4, P1, P2, P3, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 1.201 (a0) | | |
| 3 | −3.221 | 1.400 (d1) | 1.654 | 58.2 |
| 4 | −2.312 | 7.993 (a1') | | |
| P1 | planar | 0.700 (dp1) | 1.519 | 64.0 |
| P2 | planar | 0.700 (dp2) | 1.519 | 64.0 |
| P3 | planar | 0.600 (a1") | | |
| 5 | −46.880 | 1.900 (d2) | 1.623 | 60.1 |
| 6 | −8.995 | 0.400 (a2) | | |
| 7 | 35.650 | 1.000 (d3) | 1.723 | 29.3 |
| 8 | 9.078 | 2.600 (d4) | 1.489 | 70.0 |
| 9 | −33.040 | 30.359 (a3) | | |
| 10 | planar | 80.000 | | | and further comprising achromatized tube lenses having a focal length of about 180 mm and the following approximate values:

numerical aperture = 0.40   Location of the entrance pupil −∞
image scale = −19.8   object on the surface 1
field number = 20.

8. The microscope objective as claimed in claim 1, which when the phase plate is integrated into the air space between the first lens and the second lens comprises surface interfaces 1, 2, 3, 4, P1, P2, P3, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 5.009 (a0) | | |
| 3 | −22.910 | 3.500 (d1) | 1.489 | 70.0 |
| 4 | −7.047 | 19.371 (a1') | | |
| P1 | planar | 0.700 (dp1) | 1.519 | 64.0 |
| P2 | planar | 0.700 (dp2) | 1.519 | 64.0 |
| P3 | planar | 1.600 (a1") | | |
| 5 | 50.930 | 2.400 (d2) | 1.628 | 60.1 |
| 6 | −30.690 | 0.300 (a2) | | |
| 7 | 18.450 | 1.500 (d3) | 1.723 | 29.3 |
| 8 | 10.093 | 6.000 (d4) | 1.489 | 70.0 |
| 9 | 19.815 | 7.788 (a3) | | |
| 10 | planar | 80.000 | | | and further comprising achromatized tube lenses having a focal length of about 180 mm and the following approximate values:

| | |
|---|---|
| numerical aperture = 0.25 | location of the entrance pupil −∞ |
| image scale = −10.0 | object on the surface 1 |
| field number = 20. | |

9. The microscope objective as claimed in claim 1, which when the phase plate is integrated into the air space between the first lens and the second lens comprises surface interfaces 1, 2, 3, 4, P1, P2, P3, 5, 6, 7, 8, 9 and 10 wherein approximately the following system data apply:

| Surface | Radius | Thickness d Air clearance a | Refractive index $n_e$ | Abbe dispersion number $v_e$ |
|---|---|---|---|---|
| 1 | planar | 0.170 | 1.525 | 59.2 (cover glass) |
| 2 | planar | 1.201 (a0) | | |
| 3 | −3.221 | 1.400 (d1) | 1.654 | 58.2 |
| 4 | −2.312 | 7.993 (a1') | | |
| P1 | planar | 0.700 (dp1) | 1.519 | 64.0 |
| P2 | planar | 0.700 (dp2) | 1.519 | 64.0 |
| P3 | planar | 0.600 (a1") | | |
| 5 | −46.880 | 1.900 (d2) | 1.623 | 60.1 |
| 6 | −8.995 | 0.400 (a2) | | |
| 7 | 35.650 | 1.000 (d3) | 1.723 | 29.3 |
| 8 | 9.078 | 2.600 (d4) | 1.489 | 70.0 |

-continued

| Surface | Radius | Thickness d Air clearance a | Refractive index $n_e$ | Abbe dispersion number $v_e$ |
|---|---|---|---|---|
| 9 | −33.040 | 30.359 (a3) | | |
| 10 | planar | 80.000 | | | and further comprising achromatized tube lenses having a focal length of about 180 mm and the following approximate values:

| | |
|---|---|
| numerical aperture = 0.40 | Location of the entrance pupil −∞ |
| image scale = −19.8 | object on the surface 1 |
| field number = 20. | |

10. The microscope objective as claimed in claim 1, wherein the phase plate comprises two plane-parallel glass plates cemented to each other to receive a phase ring which has a phase and amplitude structure, said phase ring being vapor-deposited on a bonding surface of one of the two plane-parallel plates.

* * * * *